United States Patent [19]

Cricchi

[11] 3,836,894

[45] Sept. 17, 1974

[54] MNOS/SOS RANDOM ACCESS MEMORY

[75] Inventor: James R. Cricchi, Catonsville, Md.

[73] Assignee: Westinghouse Electric Corporation, Pittsburgh, Pa.

[22] Filed: Jan. 22, 1974

[21] Appl. No.: 435,552

[52] U.S. Cl. ............ 340/173 R, 307/238, 307/251, 340/173 DR

[51] Int. Cl. ......................... G11c 11/40, G11c 7/00

[58] Field of Search.... 340/173 R, 173 CA, 173 FF, 340/173 D, 173 R; 307/238, 279, 251

[56] References Cited

UNITED STATES PATENTS

| | | | |
|---|---|---|---|
| 3,665,423 | 5/1972 | Nakanuma et al. | 340/173 R |
| 3,774,176 | 11/1973 | Stein et al. | 340/173 FF |

OTHER PUBLICATIONS

Krick, MNOS Memory Array Fabricated on an Insulating Substrate, IBM Technical Disclosure Bulletin, Vol. 15, No. 2, 7/72, pp. 466–467.

*Primary Examiner*—Stuart N. Hecker
*Attorney, Agent, or Firm*—D. Schron

[57] ABSTRACT

A non-volatile random access memory comprising silicon on sapphire MNOS memory elements incorporated in an array having a plurality of like memory cells. Each cell is configured to provide charge enhancement symmetrically in both the read and write modes to restore or refresh the threshold voltage states of the memory elements and particularly the high or more negative threshold voltage state.

9 Claims, 12 Drawing Figures

TYPICAL VALUES $V_M = -25^V$ $V_R = -15^V$ $V_{TH}(LOW) = -3^V$ $V_{TH}(HIGH) = -10^V$

ERASE/WRITE "1"

$V_I = -V_{SS} = +25^V$

ΔV SHIFTS POS. TO "1" STATE $V_{TH} = -3^V$

WRITE "0"

$V_I = V_M = -25^V$

ΔV SHIFTS NEG. TO "0" STATE $V_{TH} = -10^V$

WRITE INHIBIT $V_I = V_{TH}$

ΔV REMAINS THE SAME (NO CHANGE)

$V_{TH} = -3^V$

READ (SOURCE FOLLOWER MODE)

$V_I = V_{TH}$

EITHER $V_S = V_R - V_T$ OR $I_S$ SENSED TO DETERMINE STATE OF MEMORY CELL

MNOS/SOS RANDOM ACCESS MEMORY

BACKGROUND OF THE INVENTION

1. Field of the Invention

This invention relates generally to semiconductor memory arrays and more particularly to a high speed read/write random access memory (RAM) including a plurality of data memory cells connected in a matrix array, together with associated address buffers, row and column decoders, and data input/output driver circuits.

2. Description of the Prior Art

A well known transistor memory element currently utilized in semiconductor memories is the metal-nitride-oxide semiconductor transistor. This device is a standard insulated gate field effect transistor in which the silicon dioxide insulator is replaced by a double insulator, typically a layer of silicon dioxide nearest the silicon substrate and a layer of silicon nitride over the silicon dioxide. Memory is obtained in an MNOS element by electrically reversible tunnelling of charge from the silicon to "traps" of electrical charge at the silicon dioxide-silicon nitride interface. The threshold voltage or the voltage applied to the gate which initiates current flow between the drain and source electrode is influenced by the charge state of the traps. These traps are conventionally charged and discharged by the application of a sufficiently large polarizing voltage of predetermined polarity coupled across the gate electrode and substrate. Information is read out of the device by way of the source and drain electrodes.

In an MNOS memory device having for example an N-type substrate and P-type source and drain regions, application of a relatively large positive polarizing potential applied to the gate when the substrate is at ground potential will charge the traps negatively and cause a permanent P-type channel to exist between the drain and source electrodes and thereby establish a first or low threshold state. This state is defined as the binary 1 state as well as the CLEAR or ERASE state. Reversal of the aforesaid relatively large polarizing potential, i.e., applying a large negative potential to the gate will charge the traps positively forming an N-type channel between the source and drain and establishing a second or a high threshold state defined as the binary 0 state. Thereafter, current can be made to flow or remain cut-off between the source and drain by the reapplication of a suitable lower bias potential. The state of the memory element therefore may be read by either of two means, voltage sensing or current sensing. If the device is operated as a source follower, the voltage at the source is a direct measurement of the memory device state.

In co-pending application Ser. No. 219,463, filed Jan. 20, 1972 (W. E. Case 43,060), there is described an MNOS memory device wherein the thickness of the silicon dioxide layer over the source and drain region is great enough to prevent tunnelling therethrough at a predetermined polarizing voltage. However, between the source and drain region, the thickness of the silicon dioxide layer is reduced to a value which will permit tunnelling therethrough at the aforesaid predetermined polarizing voltage. This ensures that the memory device will always operate in the enhancement mode, i.e., the device is normally non-conducting but can be rendered conductive by the application of a suitable potential to the gate. At the same time, the increased thickness of the oxide over the source and drain regions increases the gate to drain and gate to source breakdown voltages thereby reducing capacitive feedthrough and increasing the performance characteristics of the device.

A non-volatile memory cell utilizing MNOS transistors is well known to those skilled in the art, being taught for example in U.S. Pat. No. 3,651,492 issued to George C. Lockwood. Additionally, it is well known to periodically restore or refresh threshold or data states in MNOS memory circuits. One example of this is disclosed in U.S. Pat. No. 3,719,932 issued to Arthur M. Cappon. Other random access memory arrangements comprised of semiconductor memory cells having refresh operation includes U.S. Pat. No. 3,691,537 issued to James F. Burgess, et al. wherein voltage on the gate of the storage transistor is temporarily raised causing the transconductance to become higher and thereby overcoming threshold losses. U.S. Pat. No. 3,699,539 issued to John R. Spence on the other hand discloses a bootstrap arrangement wherein the data is reinverted and rewritten into the storage cells during a recurring write interval of a data refresh cycle following the read/write cycle. Two other references of possible interest for the teaching of refresh circuitry in the subject type apparatus is disclosed in U.S. Pat. No. 3,718,915, William W. Lattin and 3,760,380, Charles R. HOffman, et al.

In other previous MNOS array designs, the memory has been read-out with the memory element source grounded. In such an instance, the applied voltage is limited in magnitude and duration, since a large READ voltage or large number of read cycles tends to shift all of the memory elements to the high threshold voltage state. Thus there is a need for an improved MNOS memory cell having self-restoring capability in both the READ and WRITE modes to increase the period of non-volatile memory.

SUMMARY

Briefly, the subject invention comprises a memory cell having a plurality of common source-substrate connected MNOS memory transistor elements having silicon on sapphire substrates and sources selectively coupled in a source follower mode by address means to a first circuit node of a cross-coupled bistable latch circuit also comprised of MNOS devices. A second circuit node is coupled back to each of the gate electrodes of the plurality of memory transistors by measns of a voltage divider consisting of a pair of MNOS load elements. The addressed transistor memory element comprises a node charging path in combination with a parallel MNOS load element forming a second node charging path, whereupon the voltage at said first circuit node during the READ mode is a function of the threshold state of the memory element to set the bistable latch. Input data is written into an addressed memory element by applying an input data signal to the second circuit node again setting the bistable latch. The voltage at the second circuit node is coupled to the gate and then by applying a subsequent memory pulse to the circuit a polarizing voltage of proper polarity is established between the gate and drain to establish either a low or high threshold state in the memory element. The load elements coupled to the first and second circuit node preserve the DC or static circuit conditions. The READ and WRITE voltages present in the cell configuration act to enhance the memory state applied to the non-addressed cells during both the READ and WRITE modes due to the unique coupling of all the gates to the second circuit node and the source follower coupling of the commonly connected source-substrates.

DESCRIPTION OF THE PREFERRED EMBODIMENT

Figure 1:
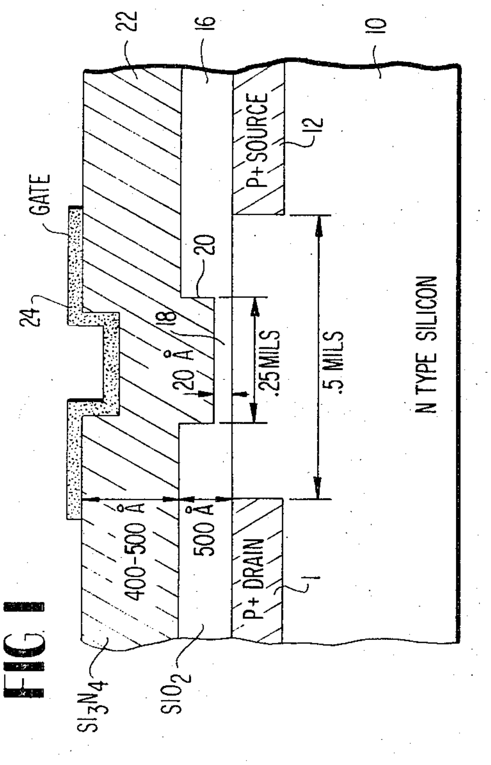
FIG. 1 is a cross-sectional view of an enhancement mode limited MNOS transistor.

With reference now to the drawings and more particularly to FIG. 1, there is disclosed an enhancement mode limited metal-nitride-oxide semiconductor device, hereinafter referred to simply as an MNOS, which includes a substrate 10 of N-type silicon having P+ source and drain regions 10 and 14 diffused into the upper surface thereof and separated by space typically of a width in the order of 0.5 mils. Deposited on the upper surface of the substrate 10 is a layer 16 of silicon dioxide $SiO_2$ having a thickness over the source and drain regions in the order of 500 angstrom units (A). Intermediate the source and drain regions 12 and 14 is a reduced thickness region 18 in the order of 20 A and having a width in the order of 0.25 mils. Covering the silicon dioxide layer 16 and including the well 20 formed by the reduced thickness region 18, is a layer 22 of silicon nitride $Si_3N_4$ followed by a gate electrode 24 of aluminum or some other similar type of material deposited on the upper surface of the silicon nitride layer 22 and spanning the gate region defined between the source and drain regions 12 and 14. Such a device is termed a drain-source protected MNOS memory element and is more fully described in the aforesaid copending application Ser. No. 219,463 filed Jan. 20, 1972, (W. E. Case 43,060).

Figure 2:
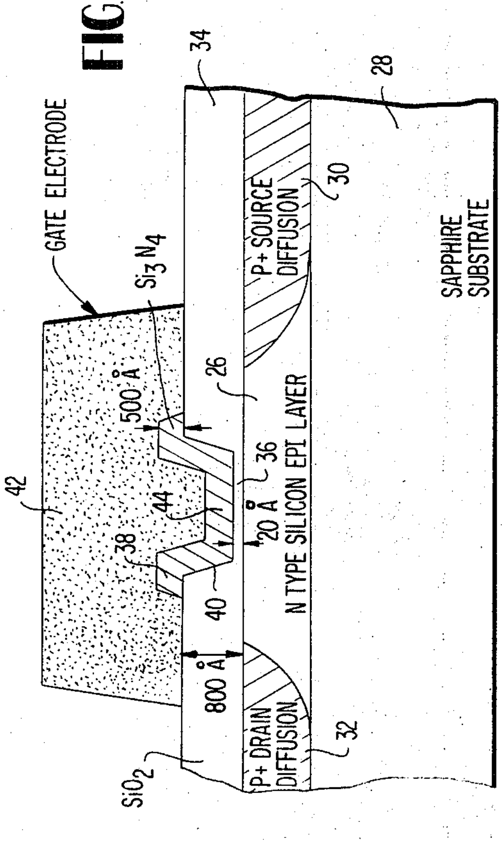
FIG. 2 is a cross-sectional view of a silicon on sapphire MNOS transistor utilized as the memory element in the subject invention.

Referring now to FIG. 2, the present invention contemplates a similar drain-source protected MNOS element but one which is fabricated on a sapphire substrate. In this instance, an epitaxial layer 26 of N-type silicon is grown to a thickness in the order of 0.05 mils on a sapphire substrate 28 followed by the diffusion of P+ type regions 30 and 32 defining the source and drain, respectively. A silicon dioxide layer 34 having a thickness in the order of 800A is formed with a reduced thickness region 36 in the order of 20A intermediate the source and drain regions 30 and 32. A silicon nitride layer 38 is formed in the well 40 with the nitride layer being in the order of 500A followed by an aluminum gate electrode 42 fabricated thereover and having a width spanning the source and drain regions 30 and 32. The silicon on sapphire configuration as shown in FIG. 2 is desired for the fabrication of the memory elements since it is possible to isolate the substrate region for each transistor memory element and to connect the source to the isolated substrate which is essential to the symmetrical charge enhancement of operation of the memory cell shown in FIG. 6 and explained subsequently.

Figure 3:
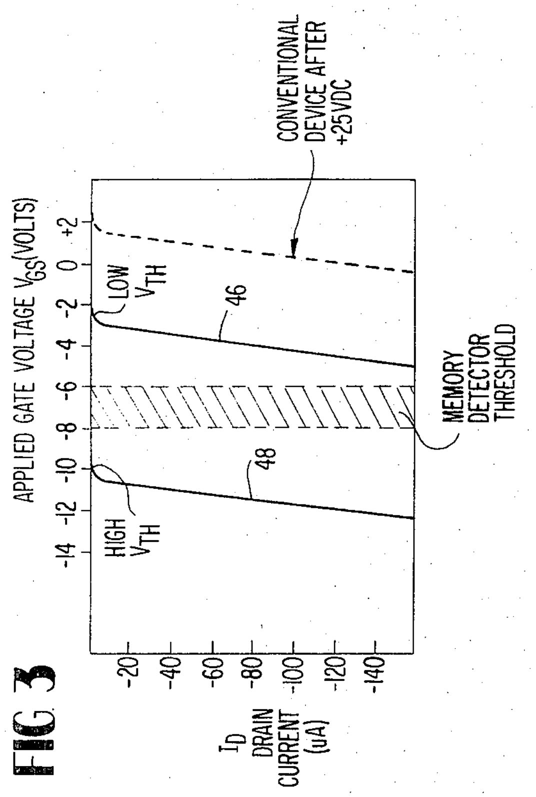
FIG. 3 is a graph illustrative of the drain to source current versus gate voltage of the MNOS devices shown in FIGS. 1 and 2.

The transfer characteristic illustrated in FIG. 3 illustrates drain to source current plotted against gate to substrate voltage. When a positive bias voltage relative to the substrate of, for example, +25 volts, is applied to the gate, a transfer curve appears as at 46 establishing what is termed as the "low" threshold state, meaning that once the bias voltage of +25 volts is removed, drain-source current will occur only when the bias voltage is again increased to the low threshold value. If on the other hand the bias voltage is initially reversed, such that −25 volts is applied to the gate relative to the substrate, the transfer characteristic changes to that as indicated by reference numeral 48. This is referred to as the "high" threshold state. Accordingly, the two distinct threshold states possible provide a binary capability such that the low threshold state when established can represent a binary 1 whereas the establishing of the high threshold state can represent a binary 0 value. Accordingly, memory is obtained in the drain-source protected memory element such as shown in FIGS. 1 and 2, by electrically reversible tunnelling of charge from the silicon to deep traps at the silicon dioxide-silicon nitride interface in the thin oxide portion of the gate only. This interface for example is shown by reference numeral 44 in FIG. 2.

Referring now to FIGS. 4A–4D, there is disclosed the four operating modes of a P-channel MNOS memory element as contemplated by the subject invention. Equating the writing of the binary 1 state with the ERASE or "CLEAR" operation, the MNOS memory element can be made to establish the low threshold state by grounding the gate electrode i.e., making it approximately $0^v$ and applying a negative voltage $V_m = -25$ volts, called the polarizing voltage, to the substrate. Thus $V_g = 0$ and $V_{ss} = V_m = -25^v$. Accordingly, the voltage across the gate insulator $V_i = -V_{ss} = +25$ volts. Tunnelling occurs in the N oxide region of the gate leaving a net negative charge near the nitride-oxide interface which creates an inversion layer in the silicon in that region. Because there is now a region of inversion interposed between the source and drain, the threshold voltage will be determined by the thick oxide portion of the gate, whereupon a low threshold voltage $V_{th} = -3$ volts, is established.

As noted above, the high threshold value can be established in a WRITE mode by grounding the substrate and the source while applying the negative voltage $V_m = -25$ volts to the gate. In this condition, it can be shown that the voltage across the gate insulator now becomes $V_i = V_m = -25$ volts. Tunnelling occurs in the nitride-oxide interface traps at the thin oxide portion of the gate resulting in a net positive charge. This causes an accumulation layer at the silicon surface to be interposed between the source and drain of the transistor, resulting in the threshold voltage being shifted to $T_{th}$ = −10 volts. The threshold of the memory element in this situation is determined by that of a thin oxide region of the gate rather than the thick oxide region. It should be noted that in both of the above modes, the substrate and the source are at the same voltage while the voltage applied to the drain in both instances is equal to $V_m$.

Figure 4A:
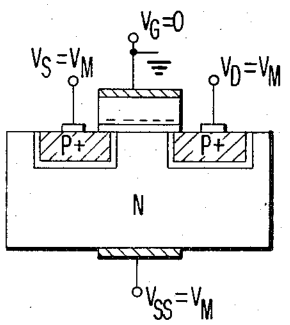
FIGS. 4A/4D are simplified diagrams illustrative of an MNOS transistor memory element and its modes of operation in the present invention.
Figure 4B:
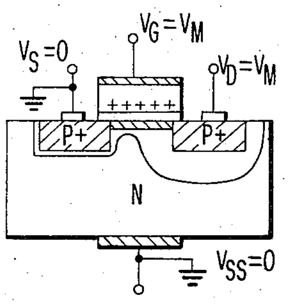
Figure 4C:
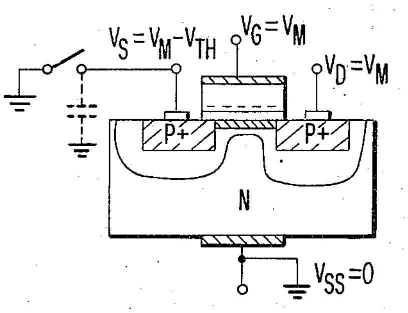
Figure 4D:
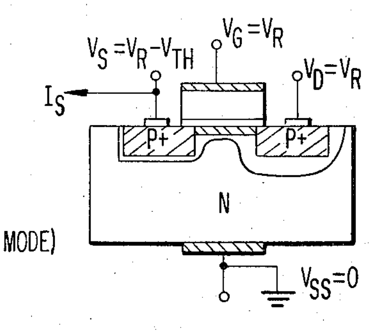

An important third condition is called the "WRITE INHIBIT" mode where non-addressed memory elements have their source electrodes open circuited. There still exists, however, a distributed capacitance to ground at the source. The voltage conditions are illustrated in FIG. 4C. Since the source follows the applied gate voltage very closely, the condition where the substrate is grounded and the gate and drain potentials applied comprises $V_m = -25^v$, the voltage across the channel varies between the source voltage $V_s = V_m - V_{th}$ and the voltage appearing at the drain $V_m$. Therefore, the voltage across the reduced oxide portion is very nearly equal to the threshold voltage $V_{th} = -3$ volts. Since this is not enough to change the memory state, the low threshold state is preserved. By connecting the substrate to the source charge enhancement takes place as will be discussed subsequently.

The state of the MNOS memory element can be read in either of two ways. One method is by voltage sensing the voltage at the source while connected in a voltage follower configuration or by sensing the current flow when the bias voltage is reapplied after establishing either a low or high threshold state during the WRITE mode. Since the device is operated as a source follower in the READ mode, the voltage $V_s$ at the source varies as $V_s = V_r - V_{th}$ where $V_r$ is typically −15 volts. Accordingly, $V_{th} = V_i$ and corresponds to −3 volts in the low threshold state, and −10 in the high threshold state, and therefore the application of the read voltage $V_r$ enhances the high threshold state during the READ mode.

Figure 5:
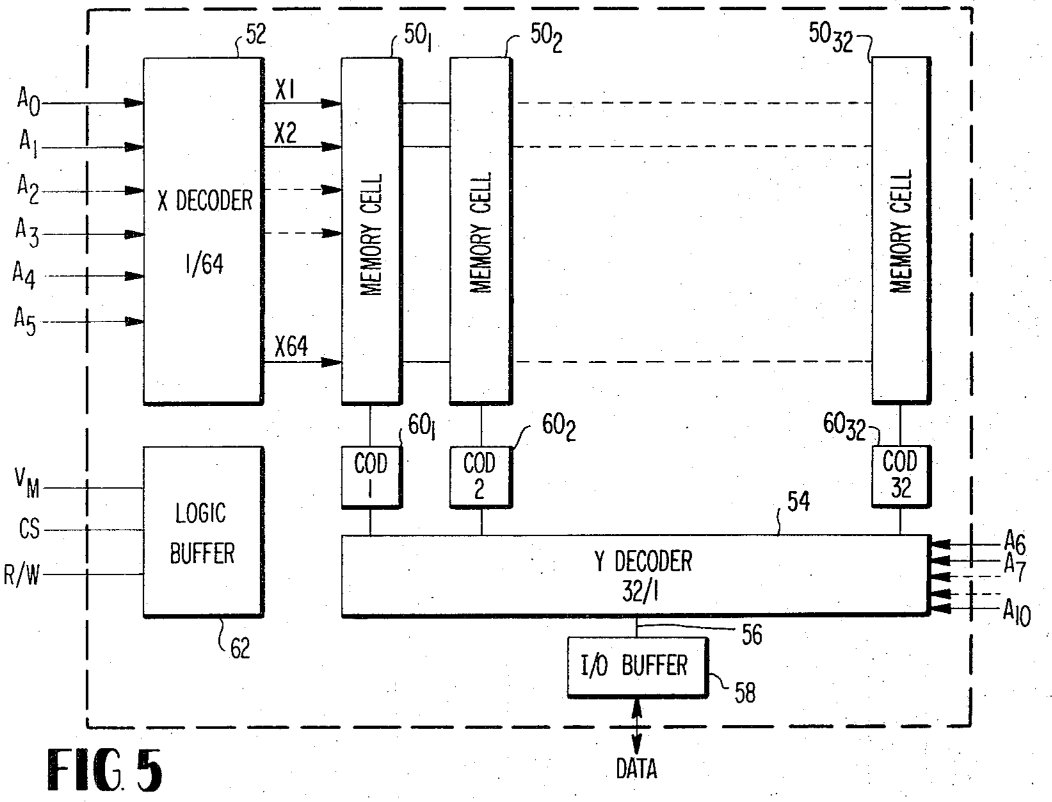
FIG. 5 is a block diagram illustrative of a typical random access MNOS memory array.

A MNOS random access memory array designed to utilize MNOS transistors adapted to operate as shown by FIGS. 4(A) through 4(D) is shown in block diagrammatic form in FIG. 5. The array consists of the plurality, for example 32, memory cells 50$_1$, 50$_2$ ... 50$_{32}$ which form respective columns of the total memory array. Associated therewith is an X or row decoder 52 having inputs $A_0$, $A_1$ ... $A_{52}$ and 64 outputs $X_1$, $X_2$, ... $X_{64}$, signifying that the array is arranged at 64 rows by 32 columns. Each memory cell 50$_1$, 50$_2$ ... 50$_{32}$ comprises a column of the array which also includes a Y or column decoder 54 having five address inputs $A_6$ ... $A_{10}$ as well as a data input/out line 56 coupled to an input/output buffer unit 58. The Y decoder unit 54 couples to the memory cells 50$_1$, 50$_2$ ... 50$_{32}$ through a respective column detection circuit 60$_1$, 60$_2$ ... 60$_{32}$. Control signals are applied to the array through a logic buffer unit 62 which receives control signals $V_m$ which controls the memory pulse duration, CS which selects which memory cell is active and a R/W signal which determines the READ or WRITE mode of operation.

Figure 6:
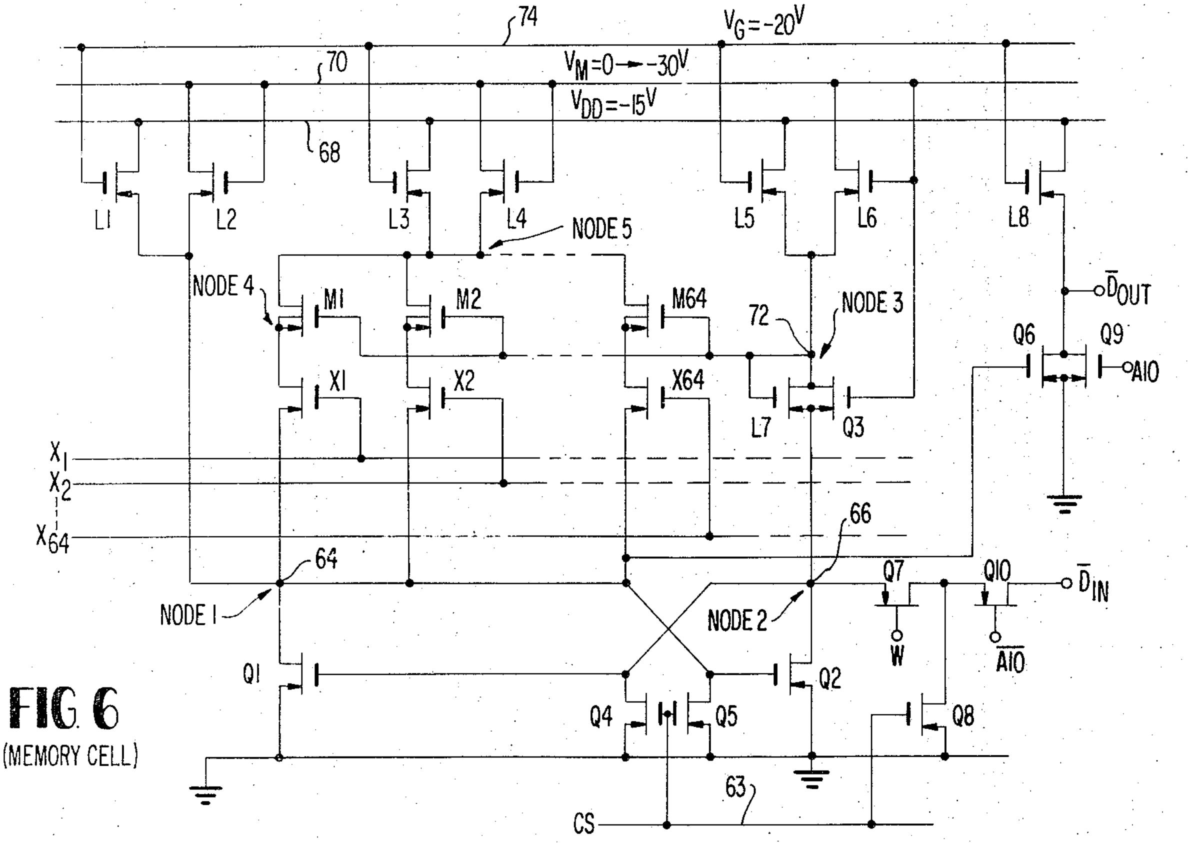
FIG. 6 is an electrical circuit diagram of the preferred embodiment of the memory cell contemplated by the subject invention.

Referring now to FIG. 6, there is schematically disclosed one of the memory cells which comprises a 64 word × 1 bit configuration comprising MNOS memory elements M1 through M64. The memory elements M1 ... M64 are comprised of silicon on sapphire (SOS) MNOS devices. Each has a common source-substrate connection (node 4) coupled to the drain of a respective row address MNOS switch X1, X2 ... X64. These switches have their respective gates connected to row select lines X1, X2 ... X64. The source electrodes of the address MNOS transistors X1 ... X64 are commonly connected to a circuit junction 64 (node 1). Circuit junction 64 is also common to the drain of MNOS transistor Q1 which is one half of a bistable latch including MNOS transistor Q2. MNOS transistors Q4 and Q5 act as shunts when conductive by means of a chip select signal CS applied to circuit buss 63 to render the bistable latch inoperative by grounding circuit junctions 64 and 66 (nodes 1 and 2). Circuit junction 64 is also common to the gate of output data MNOS transistor Q6 as well as the source electrodes of load MNOS transistors L1 and L2. The drain electrodes (node 5) of all of the memory MNOS transistors M1, M2 ... M64 are commonly connected to the drains of a second pair of load MNOS transistors L3 and L4.

The drain electrodes of transistors L1 and L3 are commonly connected to a drain voltage supply circuit buss 68 to which is applied a typical supply voltage $V_{DD} = -15^v$. The gate and drain electrodes of MNOS transistors L2 and L4, however, are commonly connected to circuit buss 70 which carries a memory pulse $V_m$ which when applied goes from $0^v$ to $-30^v$ typically. The gate electrodes of the MNOS memory elements M1, M2 ... M64 are all commonly connected at junction 72 (node 3) to the source electrodes of a third pair of load MNOS transistors L5 and L6 as well as the drain electrodes of MNOS transistors L7 and Q3. Elements L5 and L7 form a voltage divider network from circuit buss 68 to circuit junction 66 (node 2) which is common to the drain of bistable latch transistor Q2. A switch transistor Q3 operates to shunt L7 when the memory pulse $V_m$ is applied.

Circuit junction 66 (node 2) which is common to the drain of Q2 also connects to the source of input data MNOS gate transistor Q7, having its gate electrode coupled to the WRITE control signal W. The drain of transistor Q7 connects to the source of a column address transistor Q10 having an address signal A10 selectively applied to the gate and to the drain of MNOS transistor Q8 which acts as a deactivating device for the chip select signal CS appearing on circuit buss 74. In a like manner during the READ mode MNOS transistor Q9 having a column address signal $\overline{\textbf{A10}}$ selectively applied to the gate has its drain and source electrodes respectively connected to the drain and source electrodes of data output transistor Q6. The input data signal $\overline{D}_{in}$ is coupled to the drain of Q10 while the output data signal $\overline{D}_{out}$ is taken from the drain of Q6 and the source of load transistor L8.

The load elements L1, L3, L5 and L8 have their respective gate electrodes connected to circuit buss 74 which is adapted to have a voltage $V_G = -20^v$ continuously or periodically applied thereto thus maintaining the load elements normally conductive. The elements are also referred to as "keeper" elements which limits or clips positive going transients to a relatively low voltage by source follower action as well as preserving the DC or static conditions.

Figure 8:
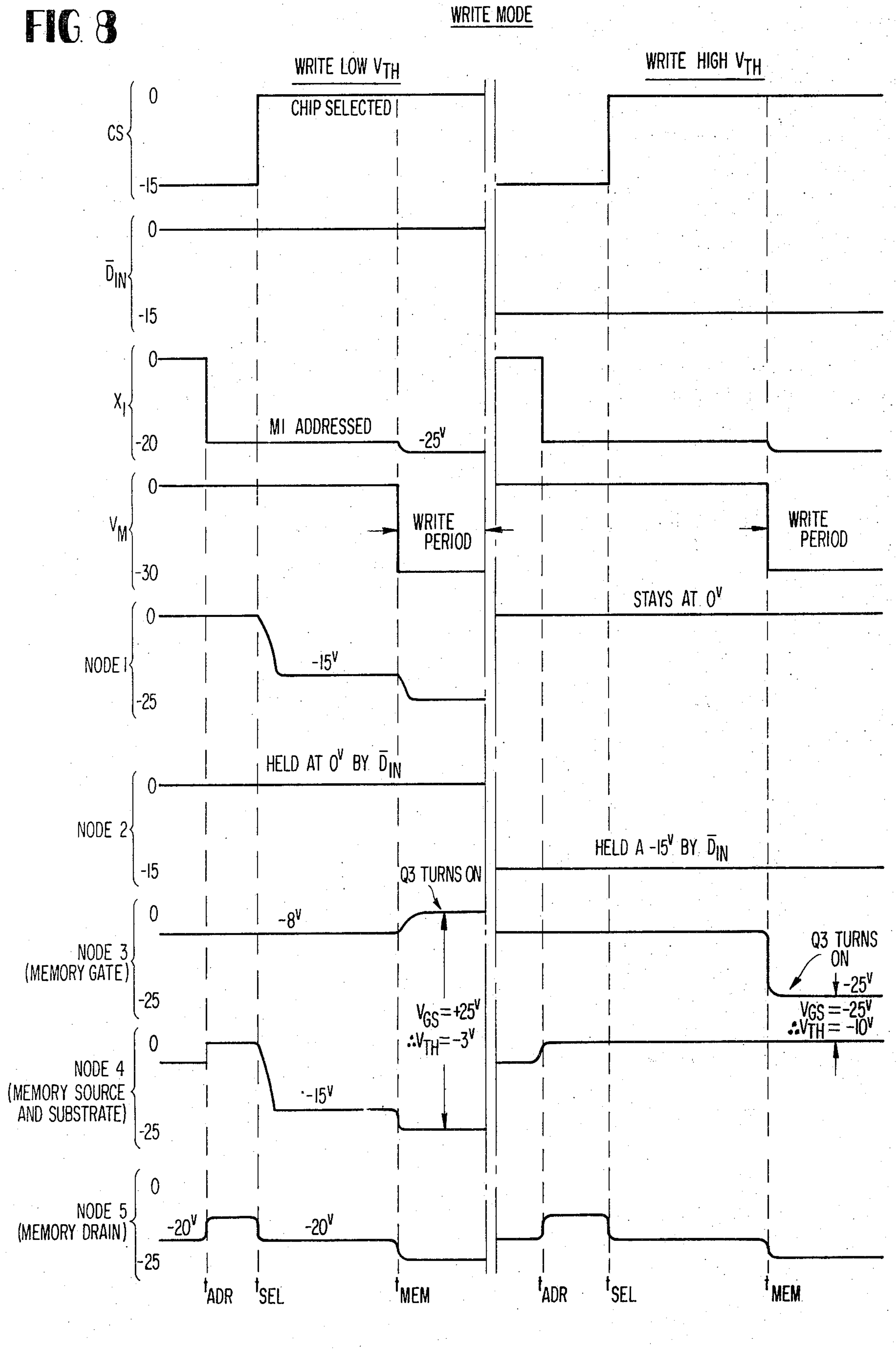
FIGS. 8 and 9 are waveforms illustrative of the operation of the memory cell.
Figure 9:
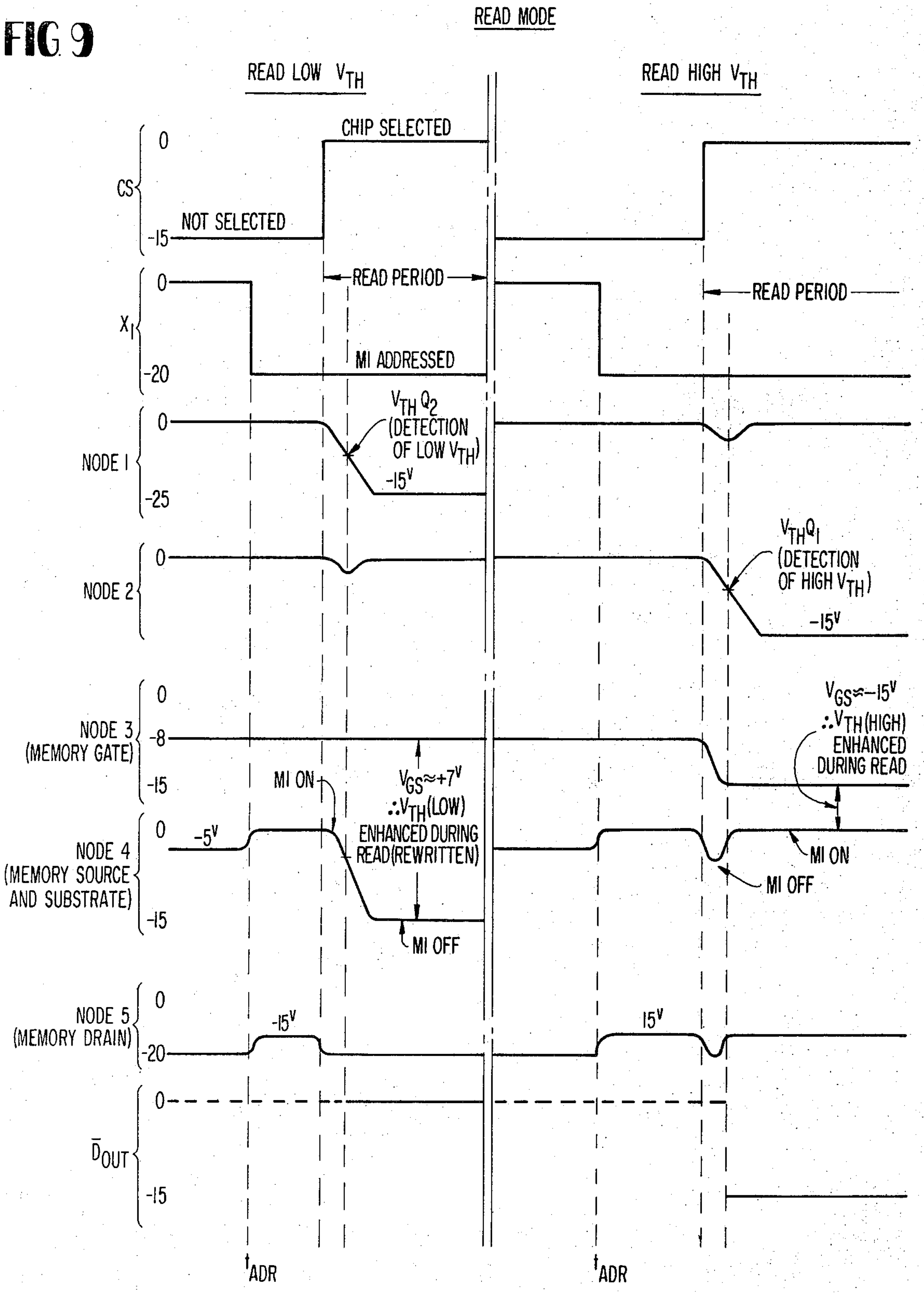

Considering now the operation of the memory cell shown in FIG. 6, reference is also made to FIGS. 8 and 9 which illustrate the voltage waveforms appearing at various circuit locations during the WRITE and READ modes, respectively. Considering first the WRITE mode and more particularly where it is desired to ERASE a previous data state and/or WRITE in a binary 1 signal corresponding to the low threshold state ($V_{th} = -3^v$) into one of the memory elements M1 ... M64 an address selection switch, for example X1, is closed by the application of a ground potential to the gate thereof by means of the line $X_1$. This then connects the common substrate-source connection (node 4) of memory element M1 to circuit junction 64 (node 1). Next, the chip select control signal CS is applied to the gates of Q4, Q5 and Q8, rendering them non-conductive, thus releasing the gate and drain electrodes of latch transistors Q1 and Q2 from ground. An input data signal $\bar{D}_{in}$ is applied to the drain of switch Q10 whereupon row address input signal $A_{10}$ is applied to the gate together with a WRITE signal to the gate of switch Q7. This operation applies a substantially zero volt ($0^v$) potential to circuit junction 66 (node 2) causing the latching flip-flop including transistors Q1 and Q2 to set such that Q1 is OFF while Q2 is in an ON state.

The MNOS load element L1 being conductive couples the supply voltage $V_{DD}$ to circuit junction 64 (node 1). The load element L1 is fabricated to act as a relatively high impedance while latch transistor Q1 is a relatively low impedance device, therefore the voltage at node 1 is in the order of −15 volts, where $V_{DD} = -15$ volts. The load element 12 meanwhile is inoperative due to the fact no memory pulse is applied and therefore has no effect on circuit operation since $V_m = 0$ at this time. Correspondingly transistor Q2 is a relatively low impedance device relative to the load elements L5 and L7 connected in series between the second circuit junction 66 (node 2) and the $V_{DD}$ supply buss 68. With node 2 at a $0^v$ level due to Q2 being ON, the load elements L5 and L7 act as a voltage divider providing a voltage level at circuit junction 72 (node 3) in the order of −8 volts for a $V_{DD} = -15$ volts. The load element L6 and the switch Q3 during this initial time are also inoperative since $V_m = 0$ and therefore are ineffective. The same may be said for the load element L4; however, the load element L3 is nevertheless effectively providing a load element to the drain of memory element M1.

Following the initial set up of the bistable latch including Q1 and Q2, a negative memorizing pulse $V_m = -30$ volts, is applied to circuit buss 70. Elements L2, L4 and L6 immediately become conductive to cause load elements L1, L3 and L5 to respectively become non-conductive due to the interconnection of the respective source electrodes and the resulting voltage levels occurring thereby. This immediately causes the voltage at the circuit junction 64 (node 1) to go from −15 volts to approximately −25 volts, since there is a very little drop across the now load element L2. The drain of memory element M1 also goes to a voltage level of a −25 volts because of L4. Upon the application of the $-30^v$ $V_m$ pulse switch Q3 also becomes conductive, shunting load element L7, causing circuit junction 72 (node 3) to drop to the voltage level of circuit junction 66 (node 2) which is approximately $0^v$. The voltage conditions thus existing between the electrodes of memory element M1 become as shown in FIG. 4A, causing the voltage across the insulator $V_i = -V_{sx} = +25$ volts. This condition sets the threshold of the memory element to the low threshold state $V_{th} = -3$ volts.

In the event that it is now desired to write in a binary 0 which is defined to be the high threshold state $V_{th} = -10^v$ of an MNOS memory element, a $\bar{D}_{in} = -15^v$ input data signal is applied to circuit junction 66 (node 2) causing the latch to set up such that MNOS transistor Q1 is now ON, while transistor Q2 is OFF. This brings the circuit junction 64 (node 1) to a $0^v$ level. Due to the low impedance of transistor Q2 with respect to load elements L5 and L7, the voltage level at circuit junction 72 (node 3) which is also the gate of memory element M1 still is approximately −8 volts. Now upon the application of the memory pulse $V_m = -30^v$ the source and substrate of M1 are at zero potential due to the conduction of transistor Q1 and node 1 is at a $0^v$ level; however, the conduction of transistor Q3 now causes the voltage level at circuit junction 72 (node 3) which is common to the gate electrode of M1 to fall to approximately $-25^v$. This set of conditions corresponds to that shown in FIG. 4B wherein the insulator voltage $V_i = V_m = -25$ volts, which causes a high threshold value $V_{th} = -10$ volts to be written.

It is interesting to note, also, that the common connection of the gate electrodes of all the memory elements M1 ... M64 being coupled to circuit connection 72 (node 3) causes a partial charge enhancement for rewriting the existing memory states of the non-address memory elements, for example M2 ... M64 where M1 is addressed. This is due to the fact that although address switches X2 ... X64 maintain an open circuit at a respective memory element M2 ... M64 to circuit junction 64 (node 1) there is still nevertheless a node capacitance to ground existing at the respective source-substrate electrodes (node 4) of the memory elements which acquires a voltage $V_s = V_m - V_{th}$. Since the voltage across the gate insulator $V_i = V_g - V_s = V_{th}$, where $V_g$ is the voltage on the gate and $V_s$ is the voltage at the source, the application of the negative $V_m$ pulse causes the voltage across the insulator to be in the proper direction to reinforce the existing threshold voltage $V_{th}$.

Considering now the READ mode, wherein a predetermined threshold state has been previously written into the memory element M1, reference can be made to FIG. 8 for the waveform illustrating the two conditions for reading both the low and high threshold states thereof. Considering first that a low or binary 1 threshold state $V_{th} = -3^v$ has been previously written into the memory element M1 it should be pointed out that load elements L2, L4 and L6 together with switch Q3 remain inoperative throughout the READ mode. Again the address switch X1 has its gate electrode grounded by means of line $X_1$, causing the common substrate-source (node 4) to be connected to circuit connection 64 (node 1). During the interim between the WRITE and READ mode, a chip select control signal CS applied to the gates Q4 and Q5 have caused the voltage at nodes 1 and 2 to be at $0^v$ level. The control signal CS now goes negative, turning off transistors Q4 and Q5. A race condition is set up for a build up of electrical charge on the drains of transistors Q1 and Q2, i.e., between nodes 1 and 2. Accordingly, a voltage build up will occur at junctions 64 and 66 (nodes 1 and 2). Since the memory element M1 is in a low threshold state, it will become conductive, i.e. turn ON. Therefore two current paths will be established for charging node 1. The first current path is through L1, while the second current path is through load elment L3, memory element M1 and switch X1. The current charge path for node 2 is through single current path comprising the series combination of load elements L5 and L7. The relative impedance values of the elements are chosen such that if the memory element M1 is conductive, the voltage build up at node 1 occurs faster than at node 2. Accordingly, since the gate of the bistable latch transistor Q2 is tied to circuit junction 64 (node 1) the threshold value of Q2 will be reached first. Transistor Q2 immediately turns ON, setting the bistable latch such that transistor Q1 is turned OFF. Accordingly, the bistable latch is set as soon as the first threshold voltage of either Q1 or Q2 occurs. Since the gate of output transistor Q6 is also tied to circuit junction 64, the voltage at node 1 which is now in a high state, i.e., binary 0 is inverted and appears at the drain of Q6 as a low or binary 1 output state.

If on the other hand a high or binary 0 threshold state $V_{th} = -10^v$ has been previously written into the memory element M1, upon the occurrence of the control voltage CS activating the bistable latch, the gate voltage (−8 volts) existing at circuit junction 72 (node 3) will not be sufficient to cause memory element M1 to become conductive. Therefore circuit node 1 will be charged through a current including load element L1 only, whereas node 2 is charged through load elements L5 and L7. The impedance values of the elements are chosen such that in this condition the charge on node 2 increases faster than at node 1, causing the threshold of Q1 to be reached first. This causes the bistable latch to be set such that the voltage at junction 64 (node 1) goes to $0^v$ due to the conduction of Q1 while the voltage at junction 66 (node 2) goes to approximately −15 volts. Since the setting of the bistable latch causes the voltage at node 1 to be approximately $0^v$, the output signal $\bar{D}_{out}$ corresponds to the high or binary 0 state due to the inversion of the output signal through transistor Q6.

For an addressed memory element, both the high threshold state $V_{th} = -10^v$ and the low threshold states $V_{th} = -3^v$ are furthermore enhanced in the READ mode by the bias levels established. Threshold enhancement of the low threshold state is achieved by the substrate connection to the source of the memory elements M1 ... M64. The reason for this is that a positive gate to source bias occurs since once the bistable latch including MNOS transistors Q1 and Q2 is set, the voltage at the common source and substrate (node 4) which is connected by switch transistor X1 to circuit junction 64 (node 1) is $-15^v$ typically, while the gate electrode which is connected to circuit junction 72 (node 3) is at $-8^v$. The low threshold state $V_{th} = -3^v$ of the memory element M1 will cause the device to conduct; however, it will subsequently turn OFF as the node capacitance of the source to ground charges to the $-15^v$ level. Thus the voltage $V_i$ across the gate insulator is the voltage between the gate and the substrate. If on the other hand the substrate were grounded as in other types of MNOS memory arrays, a positive gate to substrate bias control cannot be established. In the present invention, the positive bias across the gate insulator is achieved by forcing the source and substrate negative by the load element L1 through the address selector switch X1. It should also be pointed out that when the high threshold state $V_{th} = -10^v$ is written into the selected memory element M1, it is initially OFF during the READ mode, but subsequently turns ON due to the node capacitance of the substrate source discharging to ground since circuit junction 64 (node 1) is driven to zero potential ($0^v$) by the setting of the bistable latch.

Additionally in the READ mode, partial charge enhancement takes place which in the non-addressed memory elements, for example M2 ... M64 can be explained with reference to FIG. 4D, wherein $V_r = -15$ volts. Considering the expressions:

$$V_s = V_r - V_{th}$$

$$V_i = -V_r - V_s$$

it can be seen that for the low threshold state $V_{th} = -3^v$, $V_s = -15-(-3) = -12$ volts and $V_i = -15+(-12) = -3$ volts. Since in the READ mode the threshold voltage $V_{th} = V_i$, the threshold voltage is unchanged. For a high threshold voltage $V_{th} = -10^v$ previously written, $V_s = -15-(-10) = -5$ volts and $V_i = -15-(-5) = -10$ volts, thus the insulator voltage is at a −10 volt level which is sufficient to rewrite or refresh the high threshold level already established. Thus there is symmetrical charge enhancement in both the READ and WRITE modes.

Figure 7:
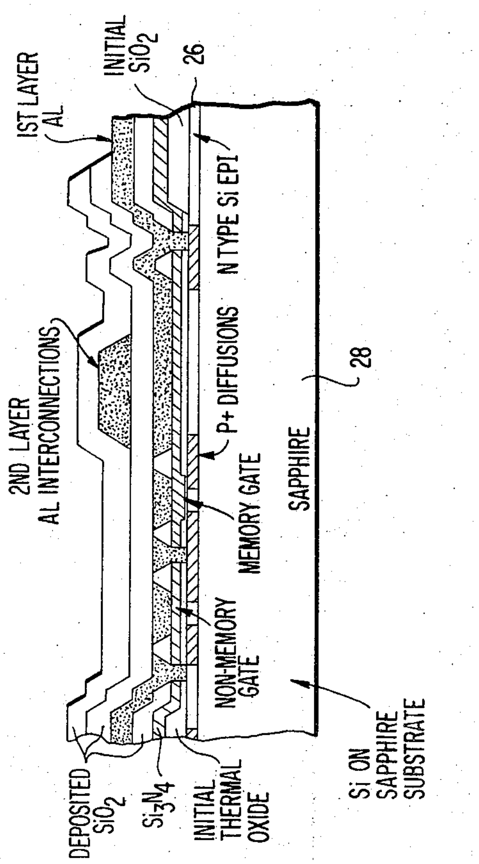
FIG. 7 is a partial cross-sectional view illustrative of the method of fabrication of the memory array and cell configuration contemplated by the subject invention modified for radiation hardness.

Referring now to FIG. 7, there is disclosed in cross-section a drain-source protected memory element array as previously described and modified for radiation hardness. Its fabrication sequence comprises: (1) growing an epitaxial layer of <100> oriented N-type silicon on a sapphire substrate; (2) depositing a 10,000A oxide layer ($S_1H_4 + 0_2$) at 500°C; (3) performing a first masking step for the definition of isolated silicon regions and carrying out anisotropic silicon etching; (4) removing the oxide and thermally growing a 1000A layer of oxide at 1000°C; (5) depositing a 4000A layer of oxide at 500°C; (6) performing a second masking step for definition of the source and drain diffusions; (7) diffusing P+ (boron) source and drain regions at 1000°C; (8) performing a third masking step for definition of gate and contact window regions; (9) performing MNOS gate cleaning procedures and thermally growing at 1000°C a 600A gate oxide for non-memory devices; (10) carrying out a fourth masking step for definition of memory gate regions; (11) performing a MNOS gate cleaning procedure followed by gate oxide formation in a nitride reactor and carrying out a 400A nitride deposition in situ at 800°C; (12) depositing a 10,000A oxide layer at 500°C; (13) performing a fifth masking step for ohmic contact regions by (*a*) etching the 10,000A oxide layer (*b*) etching the 400A nitride layer (*c*) etching the 600A oxide layer; (14) carrying out a sixth masking step for removal of oxide over the silicon nitride gate regions; (15) depositing a 12,000A aluminum film for the first layer of metal interconnections; (16) depositing a 10,000A oxide layer at 500°C; (17) carrying out a seventh masking step for interconnection to interconnection vias; (18) depositing a 10,000A aluminum film for a second layer of metal interconnections; (19) depositing doped oxides for metal protection and surface passivation; and (20) carrying out an eighth masking step for via windows to bonding pads.

While the present invention has been shown in connection with a preferred embodiment, it will readily become apparent to those skilled in the art that various changes in the form and arrangement of parts may be made to suit the certain selective requirements without departing from the spirit and scope of the present invention.

I claim:

1. In a digital random access memory comprised of a matrix of variable threshold memory cells providing charge enhancement of memory elements during both READ and WRITE modes of operation, a memory cell including:

a bistable latch circuit having first and second cross coupled switch devices, said switch devices including a pair of current carrying electrodes and a control electrode;

a first load element coupled to one current carrying electrode of said first switch device to define a first circuit node, said first circuit node also being connected to the control electrode of said second switch device;

a second and third series connected load element, having a common connection therebetween, coupled to a corresponding one current carrying electrode of said second switch device to define a second circuit node, said second circuit node also being connected to the control electrode of said first switch device;

control means selectively operated by a control signal, coupled to said first and second switch devices, rendering both said switch devices inoperative and holding said first and second circuit nodes at a predetermined reference voltage except during said READ and WRITE modes at which time said control means becomes inoperative;

a plurality of MNOS memory elements comprised of a substrate, source, drain and gate electrodes, and wherein the respective substrate and source electrodes are commonly connected together to define a fourth circuit node;

a respective plurality of switch devices selectively energized for addressing a respective memory device by coupling the common substrate-source connection of a selected MNOS memory device to said first circuit node;

means coupling said gate electrode of said plurality of MNOS memory devices to said common connection between said second and third load elements and defining a third circuit node thereat;

said common substrate and source electrode connection defining a fourth circuit node and providing a node capacitance thereat which in combination with the operation of said first load element connected to said first circuit node and the coupling of said fourth circuit node thereat by means of said energized selected switch device during the READ mode is adapted to provide a positive gate to source electrode bias on the addressed memory device and thereby enhance a previously written threshold state of the addressed memory device and also provide a partial charge enhancement of the non-addressed memory elements of said plurality of MNOS memory elements;

a fourth load element commonly connected to the drain electrodes of said plurality of MNOS memory devices and defining a fifth circuit node;

fifth, sixth and seventh load elements rendered operative by and coupling a memory pulse of predetermined polarity to said first, fifth and third circuit nodes respectively during a portion of said WRITE mode and rendering said first, second and fourth load elements inoperative when rendered operative;

third switch means energized by said memory pulse coupled across said third load element and becoming operative thereby to shunt said third load element during said portion of said WRITE mode and to connect said third circuit node directly to said second circuit node;

data input means coupled to said second circuit node and being operable during said WRITE mode to couple a predetermined data input signal thereto to set said bistable latch and establish a predetermined threshold state on said selected MNOS memory device; and data output means coupled to said first circuit node and being operable during said READ mode to sense the voltage level thereat, said voltage level being indicative of the previously established threshold state of said selected MNOS memory device.

2. The memory cell as defined by claim 1 wherein said plurality of MNOS memory elements are comprised of devices having like semiconductivity and wherein said substrate comprises an epitaxial silicon layer on a sapphire chip.

3. The memory cell as defined by claim 2 wherein said first and second switch devices of said bistable latch circuit and said third switch means are comprised of MNOS devices of said like channel conductivity type.

4. The memory cell as defined by claim 3 wherein all of said load elements are comprised of MNOS devices of said like conductivity type.

5. The memory cell as defined by claim 4 wherein said control means comprises first and second MNOS devices of said like semiconductivity.

6. The memory cell as defined by claim 5 wherein all said MNOS devices comprise P channel devices.

7. The memory cell as defined by claim 1 wherein said plurality of MNOS memory elements comprise devices having a region of reduced thickness in a silicon dioxide layer intermediate the source and drain regions associated with said source and drain electrodes and formed in the silicon substrate portion.

8. The memory cell as defined by claim 1 wherein said first and second switch devices of said bistable latch comprise MNOS devices of relatively low impedance when conductive, and wherein said first, second and third load elements are comprised of MNOS devices of relatively high impedance when conductive.

9. The memory cell as defined by claim 8 wherein said second and third load elements are comprised of MNOS devices of relatively equal impedances.

* * * * *